US007668831B2

(12) United States Patent
DeRobertis et al.

(10) Patent No.: US 7,668,831 B2
(45) Date of Patent: Feb. 23, 2010

(54) ASSIGNING UNIQUE IDENTIFICATION NUMBERS TO NEW USER ACCOUNTS AND GROUPS IN A COMPUTING ENVIRONMENT WITH MULTIPLE REGISTRIES

(75) Inventors: Christopher V. DeRobertis, Hopewell Junction, NY (US); Yantian T. Lu, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 586 days.

(21) Appl. No.: 11/260,796

(22) Filed: Oct. 27, 2005

(65) Prior Publication Data

US 2007/0100929 A1      May 3, 2007

(51) Int. Cl.
G06F 7/00       (2006.01)
(52) U.S. Cl. .......................................................... 707/9
(58) Field of Classification Search ...................... 707/9
See application file for complete search history.

(56) References Cited

U.S. PATENT DOCUMENTS

| | | | | |
|---|---|---|---|---|
| 6,456,191 | B1 | 9/2002 | Federman | 340/10.2 |
| 6,785,818 | B1 | 8/2004 | Sobel et al. | 713/200 |
| 2002/0194488 | A1 | 12/2002 | Cormack et al. | 713/200 |
| 2003/0191673 | A1* | 10/2003 | Cohen | 705/5 |
| 2004/0034650 | A1* | 2/2004 | Springer, Jr. et al. | 707/102 |
| 2004/0236717 | A1* | 11/2004 | Demartini et al. | 707/1 |
| 2005/0050054 | A1* | 3/2005 | Clark et al. | 707/100 |
| 2005/0131894 | A1* | 6/2005 | Vuong | 707/5 |

FOREIGN PATENT DOCUMENTS

| | | | |
|---|---|---|---|
| JP | 8184315 | A | 7/1995 |
| JP | 10124457 | A | 5/1998 |
| JP | 10285153 | A | 10/1998 |
| JP | 10303946 | A | 11/1998 |
| RU | 2150142 | C1 | 5/2000 |
| WO | WO9847057 | A2 | 10/1998 |
| WO | WO0260791 | A2 | 1/2002 |
| WO | WO03034632 | A2 | 4/2003 |

* cited by examiner

*Primary Examiner*—Charles Rones
*Assistant Examiner*—Fazlul Quader
(74) *Attorney, Agent, or Firm*—Matthew W. Baca, Esq.; Kevin P. Radigan, Esq.; Heslin Rothenberg Farley & Mesiti, P.C.

(57) ABSTRACT

A method, system, and program storage device for creating a new user account or user group with a unique identification number in a computing environment having multiple user registries is provided. In response to receiving a command to create a new user account or user group, an operating system of a clustered computing environment automatically checks multiple registries configured for the operating system to determine whether a candidate identification number for the new user account or user group has been assigned already to one or more existing user accounts or groups, respectively. The operating system automatically assigns the candidate identification number to the new user account or user group created in a target user registry if the checking indicates that the candidate identification number has not been assigned already to any of the existing user accounts or user groups, respectively.

20 Claims, 6 Drawing Sheets

ASSIGNING UNIQUE IDENTIFICATION NUMBERS TO NEW USER ACCOUNTS AND GROUPS IN A COMPUTING ENVIRONMENT WITH MULTIPLE REGISTRIES

GOVERNMENT RIGHTS STATEMENT

This invention was made with government support under subcontract B519700 under prime contract W-7405-ENG-48 awarded by the Department of Energy. The Government has certain rights in this invention.

TECHNICAL FIELD

This invention relates in general to creating a new user account or user group in a computing environment and, more particularly, to assigning a unique identification number to a new user account or user group in a computing environment having multiple user registries.

BACKGROUND OF THE INVENTION

UNIX and UNIX-based operating systems, including LINUX, support multiple types of user registries where user account and user group identification number and management data are stored. Examples of such user registries include the local user registry (i.e., the/etc/passwd file), Lightweight Directory Access Protocol (LDAP) registry, Network Information Service (NIS) registry, and Distributed Computing Environment (DCE) registry. A single operating system or instance of an operating system may be configured to have user accounts in one or more registries. Disadvantageously, when an administrator creates a user account or user group, the numeric identification number assigned to the user account or user group may not be unique across all registries of the computing environment. Present user management interfaces for UNIX and UNIX-based operating systems only ensure that an identification number for a new user account or group is unique within the registry in which the account or group is created.

Since a UNIX-based operating system treats user accounts having the same user identification number as the same user, if user accounts in different registries are assigned the same user identification number, these users may be able to access each others' files. The problem may be even more widespread if two user groups in different registries are assigned the same identification number. In this event, all members of a user group may have access to more resources than intended. Typically, system administrators must provide their own solutions to the problem of assigning unique identification numbers to users accounts and groups across multiple registries. This is a difficult task in a clustered computing environment with multiple registries and multiple operating systems or multiple instances of operating systems running on multiple computing nodes. Such administrator-provided management of identification numbers is prone to data input errors. Also, this approach may be inconsistent, unreliable, and difficult to use because it is not integrated into the operating system.

Thus, there is a need for a method of detecting collisions between a candidate identification number for new user account or new user group and identification numbers already assigned to existing user accounts or groups in a computing environment having multiple user registries.

SUMMARY OF THE INVENTION

In one aspect, the shortcomings of the prior art are overcome and additional advantages are provided through the provision of a method of creating an identification profile in a computing environment having multiple user registries. In one aspect of the present invention, the method includes receiving, by an operating system of a clustered computing environment, a command to create a new identification profile and checking a plurality of user registries configured for the operating system to determine whether a candidate identification number for the new identification profile has already been assigned to one or more existing identification profiles, wherein the operating system automatically executes the checking in response to receiving the command to create a new identification profile. The method also includes assigning the candidate identification number to the new identification profile created in a target user registry if the checking indicates that the candidate identification number has not been assigned already to any of the existing identification profiles. The operating system automatically executes the assigning of the candidate identification number to the new identification profile in accordance with a determination indicated by the step of checking of the plurality of user registries. The user registries store information about the existing identification profiles. An identification profile may comprise a user account or a user group.

In another aspect, if the checking indicates that the candidate identification number has been assigned already to at least one of the existing identification profiles, a method of creating an identification profile in a computing environment having multiple user registries further comprises the following: further checking to determine whether a symbolic name associated with the new identification profile matches a symbolic profile name associated with at least one existing identification profile to which the candidate identification number has been assigned already; and testing a value of an attribute of the operating system. If the testing of the value of the attribute indicates that identification profiles (in the plurality of user registries configured for the operating system) associated with matching symbolic names may be assigned a common identification number, the candidate identification number is assigned to the new identification profile created in the target user registry if the further checking indicates that the symbolic name associated with the new identification profile matches the symbolic profile name associated with at least one existing identification profile to which the candidate identification number has been assigned already.

Systems and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

A method of creating a new user account or a new user group in a computing environment having multiple user registries, in accordance with an aspect of the present invention, comprises checking a plurality of user registries configured for an operating system of the computing environment to determine whether a candidate identification number for the new user account or the new user group has already been assigned an existing user account or user group in the user registries configured for the operating system. This checking of user registries configured for the operating system is executed automatically by the operating system in response to the operating system receiving a command to create a new user account or a new user group. Advantageously, this checking facilitates assigning a unique identification number to each user account or user group in the computing environment, if desired. In another example, the computing environment may be a clustered computing environment with multiple instances of an operating system running on multiple nodes of the clustered computing environment. In such systems, a method of creating a new user account or new user group in accordance with an aspect of the present invention includes checking a plurality of user registries configured for an instance of an operating system of the clustered computing environment.

As used herein, a user registry is a file or database that stores user account and user group information. Examples include an AIX® operating system local user registry file, "/etc/passwd", and the Lightweight Directory Access Protocol (LDAP) directory. (AIX® is a registered trademark of International Business Machines Corporation.) All user registries configured for an operating system are listed in a configuration file such as "/usr/lib/security/methods.cfg", for example. It should be noted that the local registry, "/etc/passwd", is not specified in "/usr/lib/security/methods.cfg" because the "/etc/passwd" registry is built-in the AIX® security library as a default registry.

In one embodiment of a method in accordance with the present invention, the command to create a new identification profile (that is, a new user account or new user group) provides a candidate identification number for the new user account or new user group to be created by the operating system. Alternatively, if the command to create a new user account or new user group does not include a candidate identification number for the new identification profile to be created, a candidate user identification number may be provided by the operating system based on the operating system's current information about the state of the target user registry in which the new user account or new user group is to be created. The command to create a new identification profile may be entered by a user of the computing environment such as a system administrator, for instance.

Figure 1:
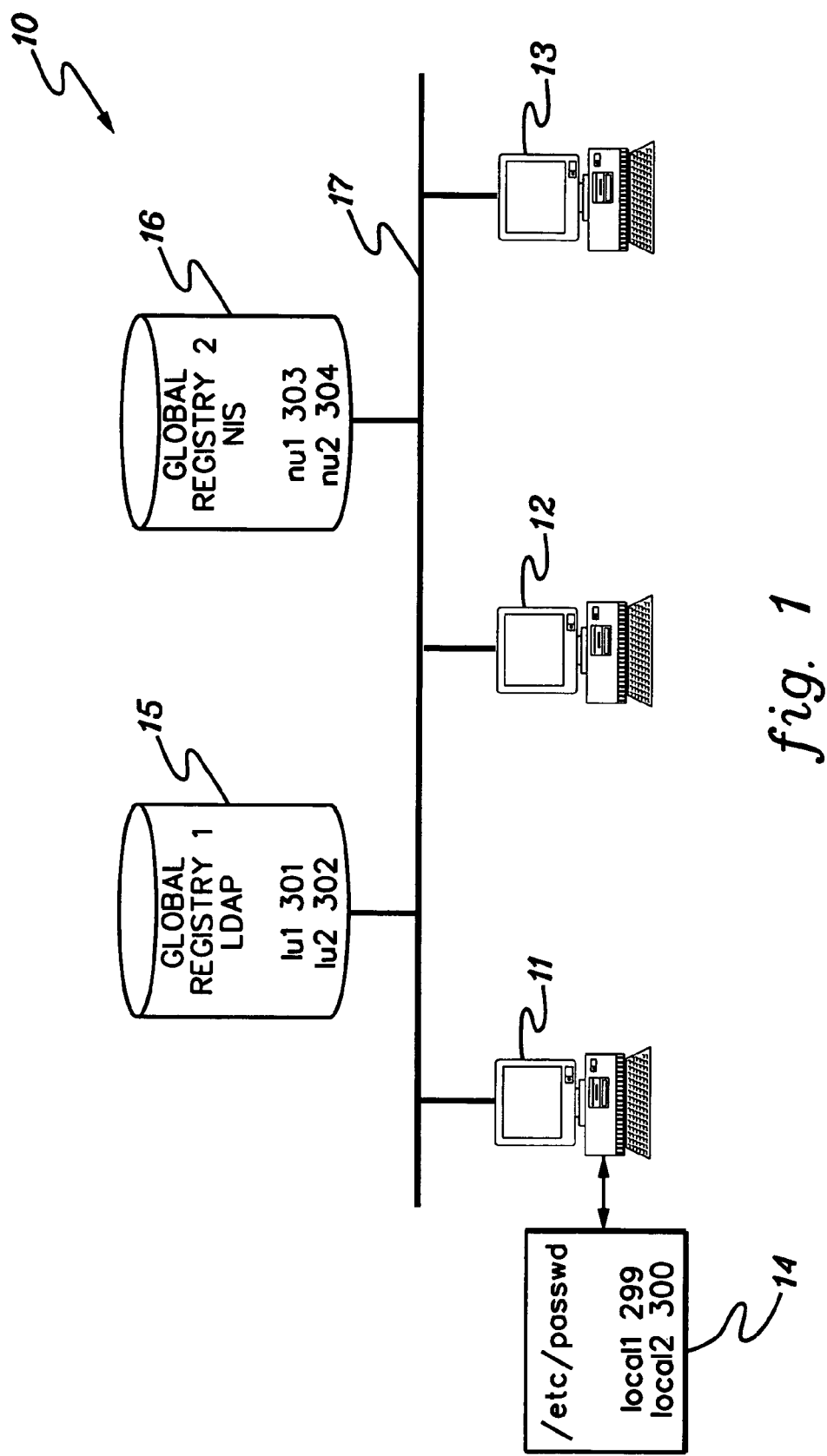
FIG. 1 illustrates a computing environment having multiple user registries, in accordance with an aspect of the present invention.

FIG. 1 illustrates clustered computing environment 10 having multiple user registries, in accordance with an aspect of the present invention. Clustered computing environment 10 includes computing node 11, computing node 12, and computing node 13. In one exemplary computing environment, an operating system or an instance of an operating system runs on each of computing nodes 11, 12, and 13. The operating systems of computing nodes 11, 12, and 13 may access global user registry 15 and global user registry 16 via data communications network 17. In addition, the operating systems of the computing nodes of the computing environment may utilize their own local user registry files. As shown in FIG. 1 for example, computing node 11 has access to local user registry 14. In this example, local user registry 14 comprises a local file named "/etc/passwd". Also in the example of FIG. 1, global user registry 15 comprises a Lightweight Directory Access Protocol (LDAP) registry, global user registry 16 comprises a Network Information Service (NIS) registry.

The current state of the user registries is also illustrated in FIG. 1. Local user registry 14 includes two user accounts, "local1" and "local2", which have been assigned user identification numbers 299 and 300, respectively. Global user registry 15 includes two user accounts, "lu1" and "lu2", which have been assigned user identification numbers 301 and 302, respectively. Global user registry 16 includes two user accounts, "nu1" and "nu2", which have been assigned user identification numbers 303 and 304, respectively.

FIGS. 2A, 2B, 2C, and 2D illustrate flowchart 20 for one embodiment of a method of creating a user account, in accordance with an aspect of the present invention. In this embodiment, the account creation commands of an AIX® operating system not only check the target registry in which a new user account or user group is to be created for identification number uniqueness, but may also check all configured registries for the operating system instance wherein the account creation command is run. Two examples of such AIX® operating system account creation commands are the mkuser command for creating a new user account and the mkgroup command for creating a new user group. In this embodiment, the behavior of an account creation command is controlled by a new operating system attribute named "dist_uniqid".

As summarized below, a candidate identification number is checked for uniqueness in response to an operating system receiving an account creation command before the candidate identification number is assigned to a new user account or new user group. The nature of the uniqueness test executed by the operating system is determined by the value of the "dist_uniqid" attribute that has been set.

If the value of dist_uniqid is set to "ALWAYS", the operating system always checks all configured registries to determine whether the candidate identification number has already been assigned to another user account or user group. In this mode, the candidate identification number is assigned to the new user account or user group if the candidate identification number is unique across all registries configured for the operating system.

Alternatively, if the value of the dist_uniqid attribute is set to "UNIQBYNAME", the operating system always checks all configured registries to determine whether the candidate identification number is unique with respect to all registries configured for the operating system, as in "ALWAYS" mode.

However, if the dist_uniqid attribute is set to "UNIQBYNAME", the candidate identification number may be assigned to a new user account or new user group even if the candidate identification number has already been assigned to one or more user accounts or user groups in the user registries configured for the operating system. In "UNIQBYNAME" mode, the candidate identification number may be assigned to the new user account (or user group) if the new user account (or new user group) has the same symbolic name as the existing user account (or existing user group) to which the candidate identification number has already been assigned. This aspect of the invention advantageously facilitates the utilization of common user name spaces across multiple host operating system instances in clustered computing environments.

If the value of dist_uniqid is set to "NEVER", the operating system only checks the candidate identification number for uniqueness against the target user registry. In one embodiment, this "NEVER" mode is the default response to a command to create a new user account or a new user group if the "dist_uniqid" attribute is not set or does not exist. Advantageously, this default behavior provides backward compatibility with operating system versions that only check a local user registry or another specified target user registry to determine the uniqueness of a candidate identification number.

Figure 2A:
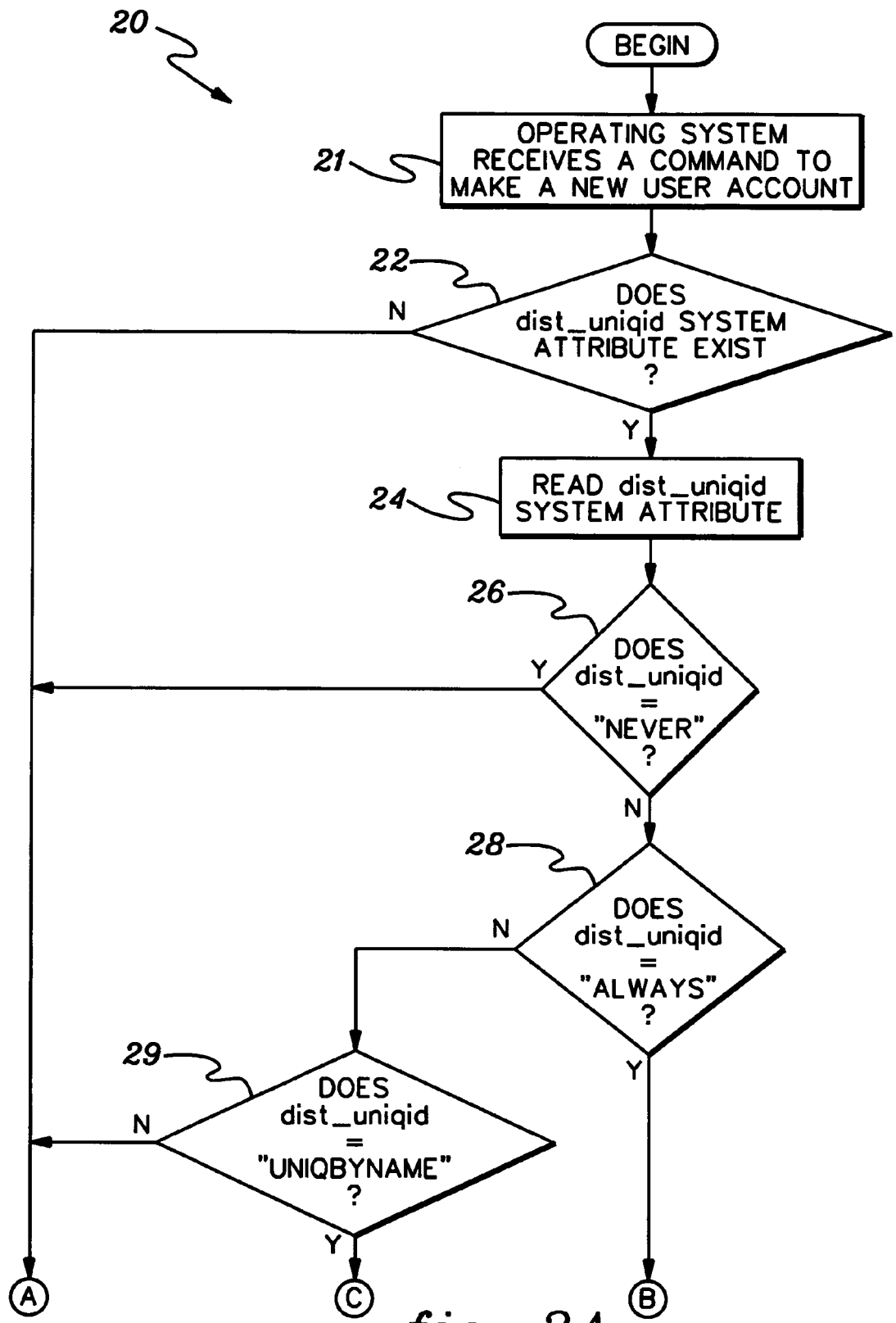
FIG. 2A illustrates a flowchart for one embodiment of a method of creating a user account, in accordance with an aspect of the present invention.

Referring to flowchart 20, which begins in FIG. 2A, for one embodiment of a method of creating a user account for an AIX® operating system, in accordance with an aspect of the present invention, this embodiment begins with an operating system receiving a command to make a new user account in step 21. In response to the received command, there is a determination 22 as to whether the "dist_uniqid" system attribute exists. If the "dist_uniqid" attribute exists, the value of the "dist_uniqid" attribute is read in step 24, and the value of the "dist_uniqid" attribute is tested to determine whether it is equal to "NEVER" in step 26. If the value of the "dist_uniqid" attribute is not equal to "NEVER", the value of the "dist_uniqid" attribute is tested to determine whether it is equal to "ALWAYS" in step 28. If the value of the "dist_uniqid" attribute is equal to "ALWAYS", the processing proceeds with branch B of flowchart 20 illustrated in FIG. 2C. If the value of the "dist_uniqid" attribute is not equal to "ALWAYS", the processing continues with the test of step 29 in FIG. 2A. If the value of the "dist_uniqid" attribute equals "UNIQBYNAME", the processing proceeds with branch C of flowchart 20 illustrated in FIG. 2D. Alternatively, if the value of the "dist_uniqid" attribute does not equal "UNIQBYNAME", the processing proceeds with branch A of flowchart 20 illustrated in FIG. 2B. Processing also proceeds with branch A of flowchart 20 if the testing in step 26 determines that the value of the "dist_uniqid" attribute is equal to "NEVER" or if determination 22 indicates that the "dist_uniqid" attribute does not exist.

Figure 2B:
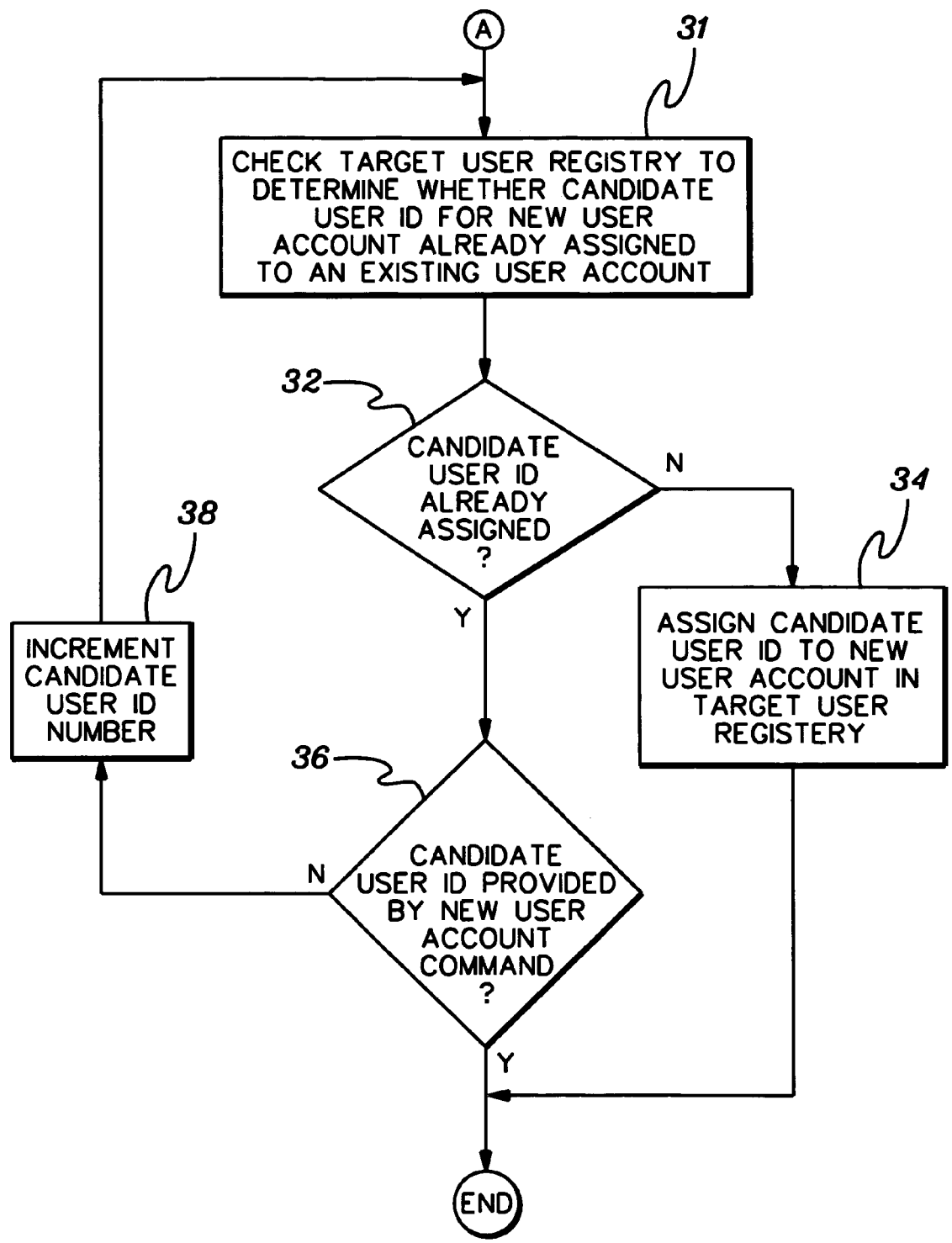
FIG. 2B illustrates one branch of the flowchart of FIG. 2A wherein a target user registry is checked for an existing assignment of the candidate user identification number, in accordance with an aspect of the present invention.
Figure 2C:
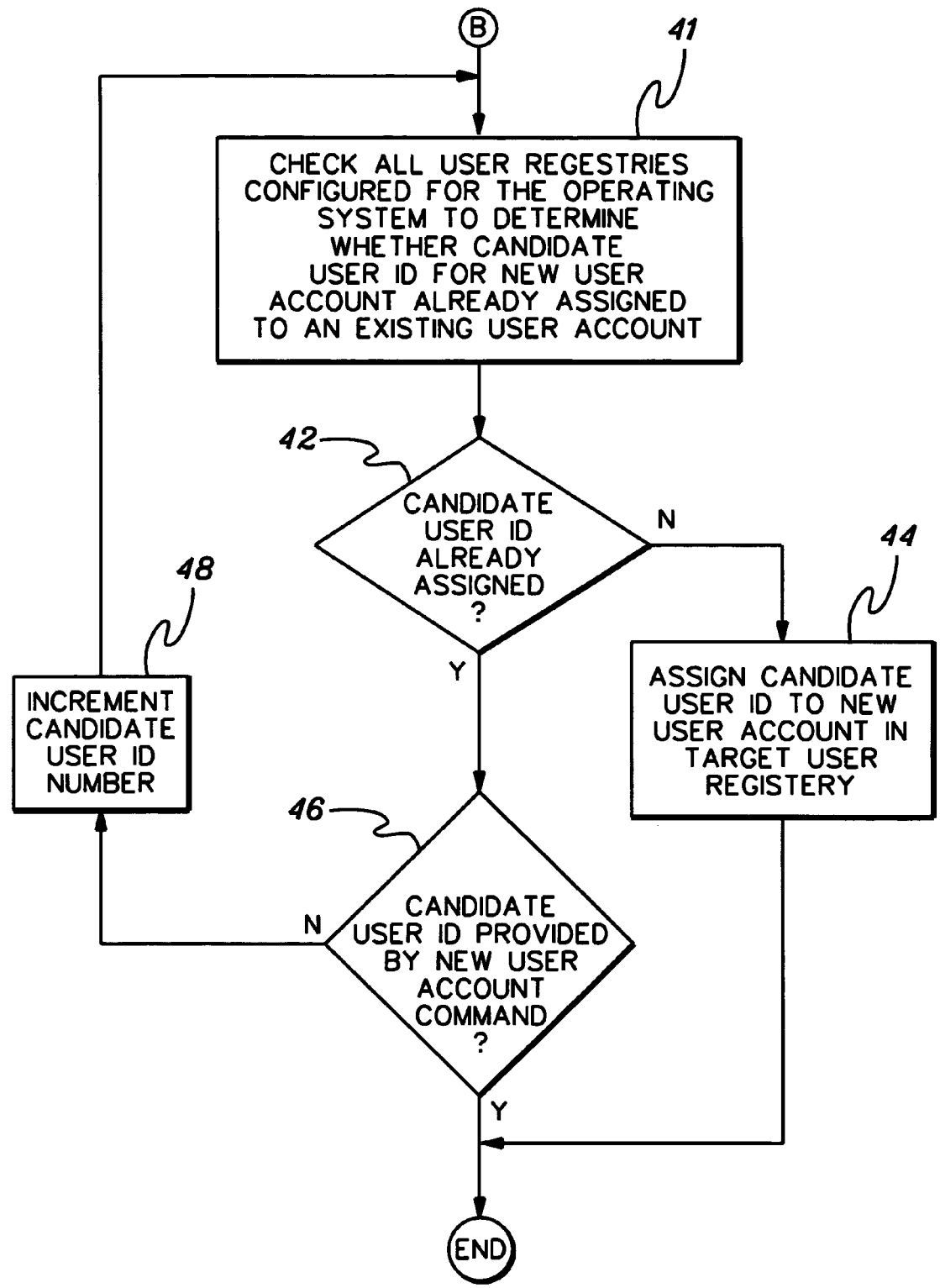
FIG. 2C illustrates one branch of the flowchart of FIG. 2A wherein all user registries configured for an operating system are checked for an existing assignment of the candidate user identification number, in accordance with an aspect of the present invention.

The "ALWAYS" mode for one embodiment of a method of creating a user account for an AIX® operating system, in accordance with an aspect of the present invention, is described in more detail below with reference to FIG. 2C. If the "dist_uniqid" attribute has been set to "ALWAYS", all user registries configured for the operating system are checked to determine whether the candidate user identification number for the new user account has already been assigned to an existing user account in the user registries in step 41. From the determination of step 42, if there is an indication that the candidate identification number has not been assigned to an existing user account, the candidate identification number is unique in all user registries configured for the operating system, and, accordingly, the candidate identification number is assigned in step 44 to the new user account created in the target user registry to complete the processing in response to the received command.

However, if, from the determination of step 42, there is an indication that the candidate identification number has already been assigned to an existing user account, the candidate identification number is not unique in all user registries configured for the operating system, and the resolution of the collision between the candidate identification number and the identification number assigned to an existing user account depends on the source of the candidate identification number. In step 46, there is a determination as to whether the candidate identification number was provided as part of the command to create a new user account or selected automatically by the operating system (because the identification number was not provided as part of the command). If the command provided the candidate identification number, the command returns without creating the requested new user account. Instead, if the new user account command did not provide the candidate identification number, the operating system attempts to find another candidate user identification number that does not collide with any user identification numbers already assigned to existing user accounts. In step 48, a new candidate user identification number is obtained by incrementing the candidate identification number that had just been determined to collide with an existing user account assignment. The processing returns to step 41 to check the new candidate user identification number against all of the user registries configured for the operating system.

Figure 2D:
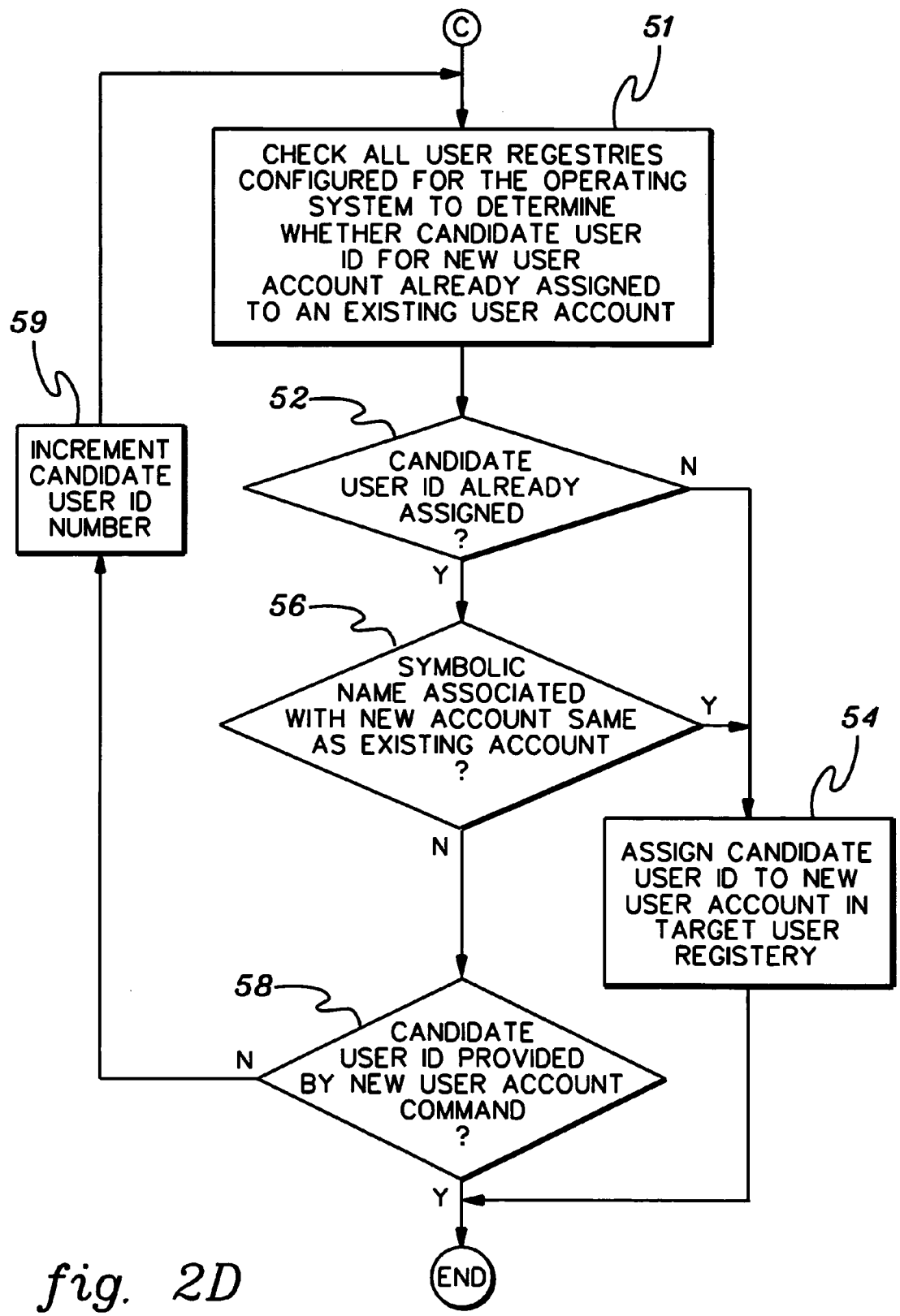
FIG. 2D illustrates another branch of the flowchart of FIG. 2A wherein a user identification number may be assigned to more than one account in user registries configured for an operating system if the accounts have the same symbolic name, in accordance with an aspect of the present invention.

If instead the "dist_uniqid" system attribute is set to permit the same user identification number to be assigned to more than one user account in the user registries configured for an operating system provided that the user accounts have the same symbolic name, the processing proceeds as illustrated in FIG. 2D. As discussed in more detail below, the processing for this unique-by-name mode (i.e., dist_uniqid attribute equals "UNIQBYNAME") begins with checking to determine whether the candidate user identification number for the new user account has already been assigned to an existing user account in the configured user registries (step 51). As in "ALWAYS" mode, if from the determination of step 52, there is an indication that the candidate user identification number has not been assigned to an existing user account, the candidate user identification number is assigned in step 54 to the new user account created in the target user registry. However, if from the determination of step 52, there is an indication that the candidate identification number has already been assigned to an existing user account in the user registries configured for the operating system, in step 56 the symbolic name associated with the new user account is compared to the symbolic name of the existing user account to which the candidate user identification number has already been assigned. If the symbolic names of the new user account and this existing user account are the same, then the candidate user identification number is assigned to the new user account created in the target user registry.

However, if the symbolic names of the new user account and the existing user account to which the candidate user identification number has already been assigned do not match, the candidate user identification number is not assigned to the new user account, and the resolution of the collision between the candidate identification number for the new user account and the identification number assigned to an existing user account having a different symbolic name depends on the source of the candidate identification number.

In step 58, there is a determination as to whether the candidate identification number was provided by the command to create a new user account. If the command provided the candidate identification number, the command returns without creating the requested new user account. Alternatively, if the new user account command did not provide the candidate identification number, the candidate user identification number, which was provided by the operating system, is incremented in step 59 to obtain a new candidate user identification number. The processing returns to step 51 to check the new candidate user identification number against all of the user registries configured for the operating system.

A third mode of operation for one embodiment of a method of creating a user account for an AIX® operating system, in accordance with an aspect of the present invention, is described in more detail below with reference to branch A of flowchart 20 illustrated in FIG. 2B. As discussed above, only a target user registry is checked to determine the uniqueness of the candidate user identification number if the value of the "dist_uniqid" system attribute is set to "NEVER". Also, this "NEVER" mode is the default mode if the "dist_uniqid" system attribute is set to some value other than "ALWAYS" or "UNIQBYNAME" or if the "dist_uniqid" system attribute does not exist. "NEVER" mode comprises checking only a target user registry to determine whether the candidate user identification number for a new user account is unique in step 31. If there is an indication that the candidate identification number has not been assigned to an existing user account in the target user registry from the determination of step 32, the candidate user identification number is assigned in step 34 to the new user account created in the target user registry to complete the processing in response to the received command.

However, if there is an indication that the candidate identification number has already been assigned to an existing user account in the target user registry from the determination of step 32, step 36 determines whether the candidate user identification number was provided by the command to create a new user account. If so, the command returns without creating a new user account. Alternatively, if the candidate user identification number was not provided by the command, the candidate identification number, which had been provided by the operating system, is incremented in step 38 to obtain a new candidate user identification number. Then, the processing loops back to the checking of step 31.

As stated above, the scope of a method, in accordance with an aspect of the present invention, includes creating a new user group in a computing environment having multiple user registries. For example, flowchart 20, illustrated in FIGS. 2A, 2B, 2C, and 2D, for one embodiment of a method of creating a user account for an AIX® operating system also describes creating a new user group for an AIX® operating system by analogy. That is, the processing described in flowchart 20 may be executed in response to a command to create a new user group rather than a new user account. In this example, analogous checking of the uniqueness of a candidate identification number for the new user group is executed, and an assignment of the candidate identification number to the new user group is made, if possible, pursuant to the outcomes of the checks of the configured user registries and the setting of the "dist_uniqid" system attribute.

Also, as will be appreciated by one of ordinary skill in the art, other embodiments for creating new user accounts and new user groups for other UNIX-based operating systems in accordance with the present invention are possible. Therefore, although these embodiments are within the spirit and scope of present invention, the scope of the present invention is not limited to user account and user group creation commands for UNIX, UNIX-based, and UNIX-like operating systems. Indeed, embodiments for any operating system that assigns a user identification number to a user account are within the scope of the present invention.

Figure 3:
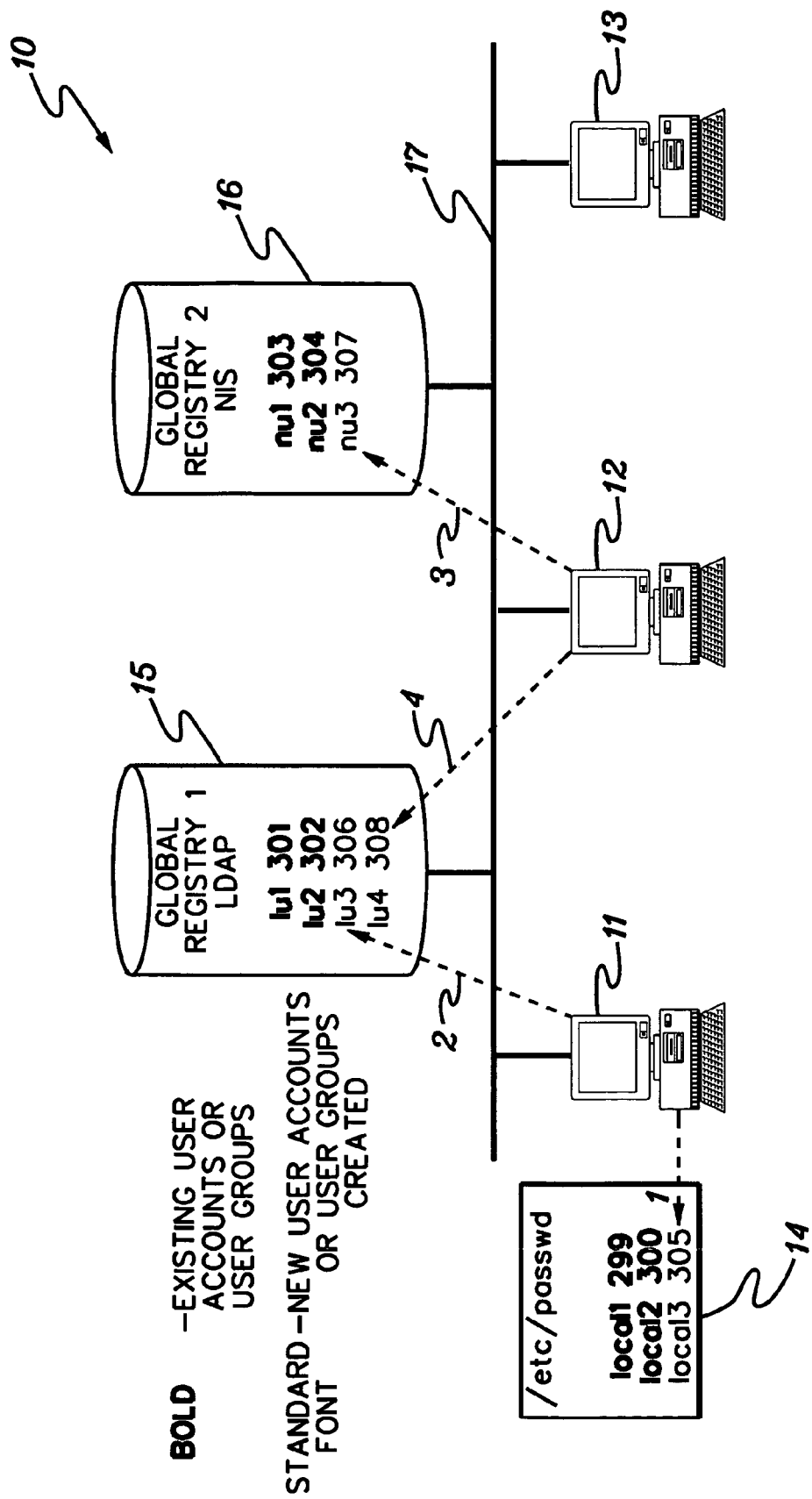
FIG. 3 illustrates the computing environment of FIG. 1 wherein several new user accounts have been created, in accordance with an aspect of the present invention.

FIG. 3 illustrates the computing environment of FIG. 1 wherein several new user accounts have been created, in accordance with an aspect of the present invention. In the example of FIG. 3, existing user accounts are denoted in boldface font to show the state of the user registries before the new user accounts, which are shown in standard font, were created. That is, before any new user accounts are created, the states of the user registries are as follows: local user registry 14 has user accounts "local1" and "local2"; global user registry 15 has user accounts "lu1" and "lu2"; and global user registry 16 has user accounts "nu1" and "nu2". (This is the state of the computing environment illustrated in FIG. 1.) The dashed lines in FIG. 3 indicate several events and their relative order in time subsequent to the time of the states of the registries denoted in boldface font. The sequence of events shown in FIG. 3 illustrates an aspect of a method of creating a new user account in accordance with the present invention.

With reference to FIG. 3, an operating system or an instance of an operating system running on computing node 11 creates local user account "local3" in local user registry 14 and assigns user the identification number 305 to the local user account "local3" (event 1). In response to a command to create a new local account received by the operating system of computing node 11, not only is local user registry 14 checked for the existence of a user account already assigned the candidate identification number, but global user registries 15 and 16, which are also configured for the operating system of computing node 11, are checked as well. Therefore, even though the user identification numbers 301, 302, 303, and 304 have not yet been assigned to user accounts in local user registry 14, none of these numbers is assigned to the new user account "local3" because the checking of global user registries 15 and 16 indicates that the user identification numbers 301, 302, 303, and 304 are already assigned to existing user accounts. The candidate user identification number for new user account "local3" continues to be incremented until candidate user identification number 305 is checked against all configured registries. Since user identification number 305 has not already been assigned in any of the configured registries, user identification number 305 is assigned to new user account "local3" in local registry 14.

Next the operating system of computing node 11 receives a command to create a new user account in the LDAP user registry (global user registry 15) of computing environment 10. In event 2, new user account "lu3" is created in the target user registry and assigned the user identification number 306. In the example of FIG. 3, the operating system of computing node 11 creates new user account "lu3" associated with user identification number 306 by writing the new user account information to global registry 15 via data communications network 17. Although the next available user identification number in global registry 15 is 303 at the time of event 2, the checking of other configured user registries comprising a method of creating new user account in accordance with the present invention determines that the next unique user identification number across all configured user registries is 306.

Similarly, when the operating system of computing node 12 receives a request to create new user account "nu3" in the NIS user registry (i.e. global registry 16), all configured user registries are checked to determine whether candidate user identification numbers for the new account have already been assigned to an existing account. After event 1 and event 2, the next unique user identification number across all configured user registries is 307. Therefore, new user account "nu3" is created in the target user registry and assigned the user identification number 307 in event 3. In addition, the operating system of computing node 12 creates a new user account "lu4" in global user registry 15 and assigns user identification number 308 to new user account "lu4" in event 4 in response to a command to create a new user "lu4" in the LDAP user registry.

The following describes how a command for creating an account determines whether a candidate user identification number has already been assigned to an existing account in one or more of the user registries configured for an operating system for the example of an AIX® operating system in one embodiment in accordance with the present invention. The AIX® routines getpwuid( ) and getgrgid( ) check whether a candidate identification number for a new user account and a new user group, respectively, is already assigned. Both the getpwuid( ) and getgrgid( ) routines call the getauthdb( ) routine of the AIX® operating system to determine which user registries to search for an existing assignment of the candidate user identification number. The getauthdb( ) routine tests the value of the "authdb" operating system variable to determine whether the value of the "authdb" variable is a null value or the name of a specific user registry is to be searched. If the value of the "authdb" variable is a null value, all user registries configured for the operating system are to be searched.

It is this feature of the AIX® operating system that is used to obtain a search of all user registries configured for the operating system. If a test of the "dist_uniqid" attribute of the operating system determines that its value is equal to "ALWAYS" or "UNIQBYNAME", the operating system's setauthdb( ) routine is called to set the "authdb" operating system variable to a null value. As a consequence, subsequent calls to the getpwuid( ) and getgrgid( ) commands cause the operating system to search all user registries configured for the operating system. (The search for an existing assignment of the candidate identification number continues until such an assignment is found or until all configured registries have been searched.) In this embodiment for the AIX® operating system, the operating system finds pathnames for the configured user registries, other than the local user registry, in a configuration file, e.g. "/usr/lib/security/methods.cfg". The local registry, "/etc/passwd", is not specified in "/usr/lib/security/methods.cfg" because the "/etc/passwd" registry is built-in the AIX® security library as a default registry. The following table provides an example of a "methods.cfg" file listing three configured user registries.

TABLE 1

| LDAP: | program = /usr/lib/security/LDAP |
| | program__64 = /usr/lib/security/LDAP64 |
| NIS: | program = /usr/lib/security/NIS |
| | program__64 = /usr/lib/security/NIS__64 |
| DCE: | program = /usr/lib/security/DCE |

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of creating an identification profile in a computing environment having multiple user registries, wherein the method comprises:

receiving, by an operating system of a clustered computing environment, a command to create a new identification profile;

checking by the operating system a plurality of different user registries configured for the operating system to determine whether a candidate identification number for the new identification profile has already been assigned to one or more existing identification profiles, wherein the candidate user identification number is received with the command to create the new identification profile or is provided by the operating system, and wherein the operating system automatically executes the checking in response to the receiving, the plurality of different user registries storing information about the existing identification profiles and comprising at least one logical user registry of the operating system and at least one global user registry of the clustered computing environment, each existing identification profile having associated therewith a unique identification number; and subsequently assigning the candidate identification number to the new identification profile created in a target user registry of the plurality of different user registries if the checking indicates that the candidate identification number has not been assigned already to any of the existing identification profiles, wherein the operating system automatically executes the assigning in accordance with a determination indicated by the checking, the target user registry being one user registry of the plurality of different user registries.

2. The method of claim 1 wherein the plurality of user registries comprises all user registries configured for the operating system of the computing environment, and wherein each user registry comprises user account and user group information.

3. The method of claim 1 further comprising, if the checking indicates that the candidate identification number has been assigned already to at least one of the existing identification profiles, not creating the new identification profile.

4. The method of claim 1 further comprising, if the checking indicates that the candidate identification number has been assigned already to at least one of the existing identification profiles:

further checking to determine whether a symbolic name associated with the new identification profile differs from symbolic profile names associated with the at least one of the existing identification profiles; and if the symbolic name associated with the new identification profile differs from symbolic profile names associated with the at least one of the existing identification profiles, not creating the new identification profile.

5. The method of claim 1 further comprising, if the checking indicates that the candidate identification number has been assigned already to any of the existing identification profiles, incrementing the candidate identification number; and repeating the checking and the assigning.

6. The method of claim 1 further comprising, if the checking indicates that the candidate identification number has been assigned already to at least one of the existing identification profiles:

further checking to determine whether a symbolic name associated with the new identification profile matches a symbolic profile name associated with the at least one of the existing identification profiles;

testing a value of an attribute of the operating system; and assigning the candidate identification number to the new identification profile created in the target user registry, even though the checking indicates that the candidate identification number has been assigned already to the at least one of the existing identification profiles, if the further checking indicates that the symbolic name associated with the new identification profile matches the symbolic profile name associated with the at least one of the existing identification profiles and if the testing determines that the value of the attribute indicates that identification profiles, in the plurality of user registries configured for the operating system, associated with matching symbolic names are assigned a common identification number.

7. The method of claim 1 further comprising:

ascertaining whether an optional operating system attribute exists for the operating system;

testing a value of the optional operating system attribute if the ascertaining indicates that the optional operating system attribute exists;

executing the checking and the assigning only if the testing indicates that one or more non-target user registries of the user registries are to be checked for a prior assignment of the candidate identification number; and otherwise, (a) checking the target user registry to determine whether the candidate identification number for the new identification profile has already been assigned to another identification profile in the target user registry in response to the receiving, and (b) assigning the candidate identification number to the new identification profile created in the target user registry if the checking (a) indicates that the candidate identification number has not been assigned already to the another identification profile in the target user registry.

8. A computer system for creating an identification profile in a computing environment having multiple user registries, wherein the computer system comprises:

a memory; and a processor in communication with the memory, wherein the computer system performs a method, the method comprising:

receiving, by an operating system of a clustered computing environment, a command to create a new identification profile;

checking by the operating system a plurality of different user registries configured for the operating system to determine whether a candidate identification number for the new identification profile has already been assigned to one or more existing identification profiles, wherein the candidate user identification number is received with the command to create the new identification profile or is provided by the operating system, and wherein the operating system automatically executes the checking in response to the receiving, the plurality of different user registries storing information about the existing identification profiles and comprising at least one logical user registry of the operating system and at least one global user registry of the clustered computing environment, each existing identification profile having associated therewith a unique identification number; and subsequently assigning the candidate identification number to the new identification profile created in a target user registry of the plurality of different user registries if the checking indicates that the candidate identification number has not been assigned already to any of the existing identification profiles, wherein the operating system automatically executes the assigning in accordance with a determination indicated by the checking, the target user registry being one user registry of the plurality of different user registries.

9. The computer system of claim 8 wherein the plurality of user registries comprises all user registries configured for the operating system of the computing environment, and wherein each user registry comprises user account and user group information.

10. The computer system of claim 8, wherein the method further comprises not creating the new identification profile in response to the command to create the new identification profile received by the operating system if the checking indicates that the candidate identification number has been assigned already to at least one of the existing identification profiles.

11. The computer system of claim 8, wherein the method further comprises:

determining whether a symbolic name associated with the new identification profile differs from symbolic profile names associated with the at least one of the existing identification profiles if the checking indicates that the candidate identification number has been assigned already to at least one of the existing identification profiles; and not creating the new identification profile in response to the command to create the new identification profile received by the operating system if the symbolic name associated with the new identification profile differs from symbolic profile names associated with the at least one of the existing identification profiles.

12. The computer system of claim 8, wherein the method further comprises:

incrementing the candidate identification number if the checking indicates that the candidate identification number has been assigned already to any of the existing identification profiles; and repeating the checking and the assigning after the incrementing of the candidate identification number.

13. The computer system of claim 8, wherein the method further comprises:

determining whether a symbolic name associated with the new identification profile matches a symbolic profile name associated with the at least one of the existing identification profiles if the checking indicates that the candidate identification number has been assigned already to at least one of the existing identification profiles;

testing a value of an attribute of the operating system; and assigning the candidate identification number to the new identification profile created in the target user registry, even though the checking indicates that the candidate identification number has been assigned already to the at least one of the existing identification profiles, if the determining indicates that the symbolic name associated with the new identification profile matches the symbolic profile name associated with the at least one of the existing identification profiles and if the testing determines that the value of the attribute indicates that identification profiles, in the plurality of user registries configured for the operating system, associated with matching symbolic names are assigned a common identification number.

14. The computer system of claim 8, wherein the method further comprises:

ascertaining whether an optional operating system attribute exists for the operating system;

testing a value of the optional operating system attribute if the ascertaining indicates that the optional operating system attribute exists;

executing the checking and the assigning only if the testing indicates that one or more non-target user registries of the user registries are to be checked for a prior assignment of the candidate identification number;

checking the target user registry to determine whether the candidate identification number for the new identification profile has already been assigned to another identification profile in the target user registry in response to the command to create the new identification profile received by the operating system; and assigning the candidate identification number to the new identification profile created in the target user registry if checking the target user registry indicates that the candidate identification number has not been assigned already to the another identification profile in the target user registry.

15. At least one program storage device readable by a computer embodying at least one program of instructions executable by the computer to perform a method of creating an identification profile in a computing environment having multiple user registries, wherein the method comprises:

receiving, by an operating system of a clustered computing environment, a command to create a new identification profile;

checking by the operating system a plurality of different user registries configured for the operating system to determine whether a candidate identification number for the new identification profile has already been assigned to one or more existing identification profiles, wherein the candidate user identification number is received with the command to create the new identification profile or provided by the operating system, and wherein the operating system automatically executes the checking in response to the receiving, the plurality of different user registries storing information about the existing identification profiles and comprising at least one local user registry of the operating system and at least one global user registry of the clustered computing environment, each existing identification profile having associated therewith a unique identification number; and subsequently assigning the candidate identification number to the new identification profile created in a target user registry of the plurality of different user registries if the checking indicates that the candidate identification number has not been assigned already to any of the existing identification profiles, wherein the operating system automatically executes the assigning in accordance with a determination indicated by the checking, the target user registry being one user registry of the plurality of different user registries.

16. The at least one program storage device of claim 15 wherein the plurality of user registries comprises all user registries configured for the operating system of the computing environment, and wherein each user registry comprises user account and user group information.

17. The at least one program storage device of claim 15, wherein the method further comprises, if the checking indicates that the candidate identification number has been assigned already to at least one of the existing identification profiles, not creating the new identification profile.

18. The at least one program storage device of claim 15, wherein the method further comprises, if the checking indicates that the candidate identification number has been assigned already to at least one of the existing identification profiles:

further checking to determine whether a symbolic name associated with the new identification profile differs from symbolic profile names associated with the at least one of the existing identification profiles; and if the symbolic name associated with the new identification profile differs from symbolic profile names associated with the at least one of the existing identification profiles, not creating the new identification profile.

19. The at least one program storage device of claim 15, wherein the method further comprises, if the checking indicates that the candidate identification number has been assigned already to any of the existing identification profiles:

incrementing the candidate identification number; and repeating the checking and the assigning.

20. The at least one program storage device of claim 15, wherein the method further comprises, if the checking indicates that the candidate identification number has been assigned already to at least one of the existing identification profiles:

further checking to determine whether a symbolic name associated with the new identification profile matches a symbolic profile name associated with the at least one of the existing identification profiles;

testing a value of an attribute of the operating system; and assigning the candidate identification number to the new identification profile created in the target user registry, even though the checking indicates that the candidate identification number has been assigned already to the at least one of the existing identification profiles, if the further checking indicates that the symbolic name associated with the new identification profile matches the symbolic profile name associated with the at least one of the existing identification profiles and if the testing determines that the value of the attribute indicates that identification profiles, in the plurality of user registries configured for the operating system, associated with matching symbolic names may be assigned a common identification number.

* * * * *

UNITED STATES PATENT AND TRADEMARK OFFICE
CERTIFICATE OF CORRECTION

PATENT NO. : 7,668,831 B2  Page 1 of 1
APPLICATION NO. : 11/260796
DATED : February 23, 2010
INVENTOR(S) : DeRobertis et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1070 days.

Signed and Sealed this

Seventh Day of December, 2010

David J. Kappos
*Director of the United States Patent and Trademark Office*